J. C. DONNELLY.
MACHINE FOR MAKING CARD MATCHES.
APPLICATION FILED NOV. 22, 1917.

1,313,471.

Patented Aug. 19, 1919.

Inventor
Joseph C. Donnelly
by his Attorney
John F. Nolan

J. C. DONNELLY.
MACHINE FOR MAKING CARD MATCHES.
APPLICATION FILED NOV. 22, 1917.

1,313,471.

Patented Aug. 19, 1919.
7 SHEETS—SHEET 4.

UNITED STATES PATENT OFFICE.

JOSEPH C. DONNELLY, OF BARBERTON, OHIO, ASSIGNOR TO THE DIAMOND MATCH COMPANY, OF CHICAGO, ILLINOIS, A CORPORATION OF ILLINOIS.

MACHINE FOR MAKING CARD-MATCHES.

1,313,471.　　　Specification of Letters Patent.　　Patented Aug. 19, 1919.

Application filed November 22, 1917. Serial No. 203,347.

*To all whom it may concern:*

Be it known that I, JOSEPH C. DONNELLY, a citizen of the United States, and resident of Barberton, in the county of Summit and State of Ohio, have invented certain new and useful Improvements in Machines for Making Card-Matches, of which the following is a specification.

This invention relates to a machine for making card matches, more especially those that are adapted to be secured within a book-like cover; my object, primarily, being to provide a machine whereby such matches can be rapidly and efficiently produced.

In the form of embodiment of my invention herein illustrated blank cards of match stock, such, for example, as thin wood veneers either with or without a covering of thin paper cemented thereto, are successively delivered to the path of a reciprocating element and thereby transferred, first, to cutting mechanism whereby each blank is partially severed transversely of its length to produce a row of alternately staggered splints having a common connecting margin at one end, and whereby the card of splints thus produced is delivered to a suitable carrier and thereby transported through the usual dipping and drying path.

The invention comprises various novel features of construction and combinations of parts which will be hereinafter described and claimed; it being understood that while I shall point out the details of the mechanism illustrated, I do not restrict myself thereto, as the apparatus may be variously modified without departing from the spirit of the invention.

In the drawings—

Fig. 1ᵃ is a plan, on a larger scale, of the forward or delivery portion of the hopper showing the card positioning devices.

Referring to the drawings, 20 designates a suitable supporting frame; and 21 a power shaft journaled in bearings in the frame. This shaft, similarly to the main shaft of a continuous match making machine, is provided with a positively-driven gear wheel 22 which is adapted to be rendered fast or loose on the shaft by suitable clutch mechanism.

24 designates a secondary shaft also journaled in bearings in the frame; and 25, 26 designate intermeshing gear wheels on the respective shafts. The gear wheel 25 is loose on the shaft, and the latter is provided with a suitable clutch, as 23, whereby wheel 25 may be rendered fast or lose at will. The gear wheel 26 is fast on the secondary shaft 24, whereby when said wheel is fast on the power shaft and the latter is positively driven the secondary shaft is actuated. Motion is transmitted through suitable connections from the secondary shaft to the various moving parts of the machine.

27 designates an auxiliary shaft having its bearings in boxes in the frame. This shaft is provided with a pinion 28 in mesh with the gear wheel 26 on the secondary shaft, and it is also provided with a hand wheel 29 whereby the shaft 27 and, perforce, the secondary shaft can be readily turned, as occasion may require, when the latter shaft is disconnected from the power shaft.

A designates a hopper or magazine adapted to support a stack of blank cards as $a$, and feed them successively to a horizontally reciprocative transfer head B.

Figures 7, 8:
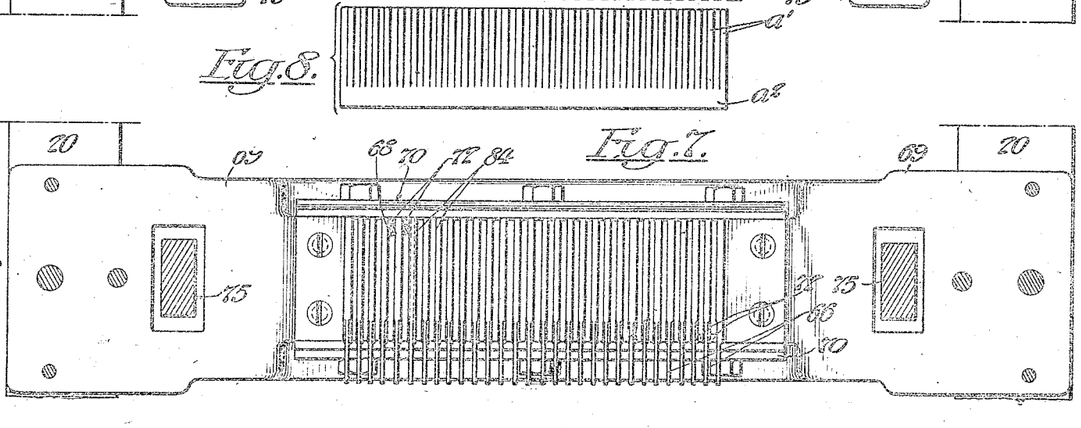
Fig. 7 is a partial horizontal section on a plane directly beneath the said stripper, as on the line 7—7 of Fig. 4.
Fig. 8 is a plan of a card of splints as positioned at the delivery end of the transfer head shown in Fig. 6.
Figure 9:
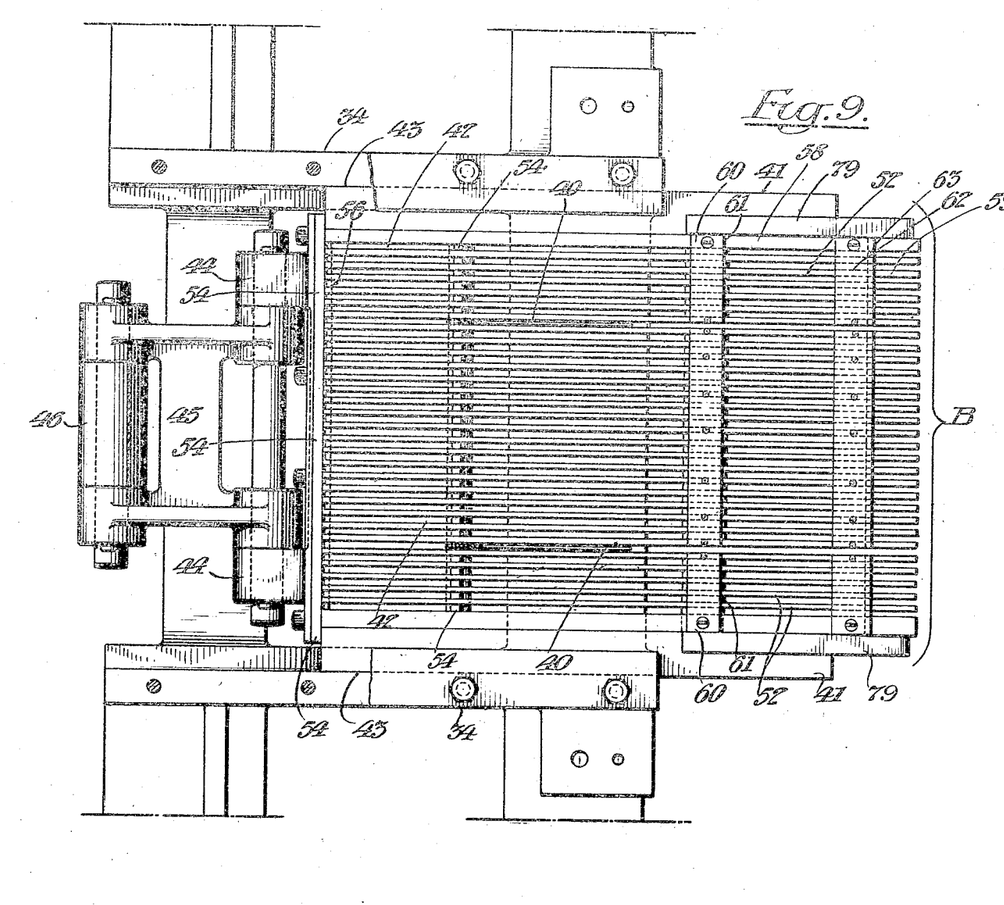
Fig. 9 is a section, on a plane through the card lifting arms of the supply hopper, showing in plan the transfer head, stripper-actuating cams thereon, the guide for said head, and adjuncts.

C designates splint-forming mechanism to the effective path of which the cards are individually delivered by the head and thereby partially slitted transversely of their length in order to produce in each card a row of alternately-staggered splints having a common connecting or marginal portion. One of the cards thus produced is represented in Fig. 8; $a'$ indicating the staggered splints, and $a^2$ the marginal connecting portion therefor.

D designates a portion of an intermittently movable carrier with which the marginal portions of the successive cards, after they have been acted upon by the splint-forming mechanism, are engaged at regular intervals through the instrumentality of the reciprocating head.

Figure 1:
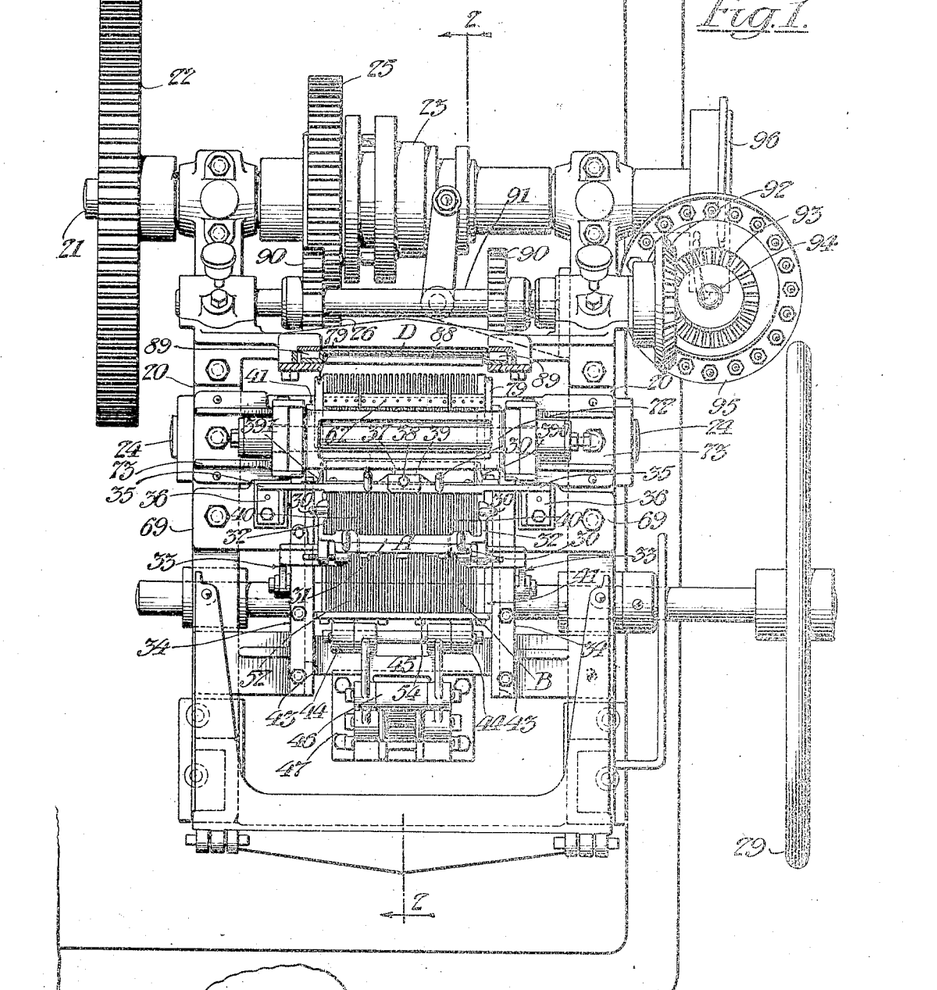
Figure 1 is a plan of a card-match machine embodying the principle of my invention; the carrier chain being shown in section.
Figure 1A:
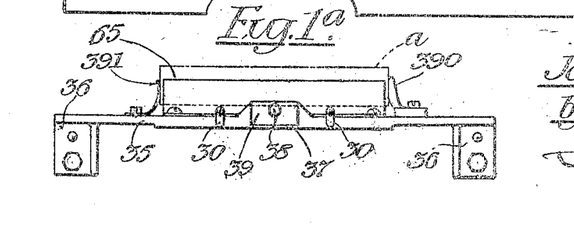
Figure 2:
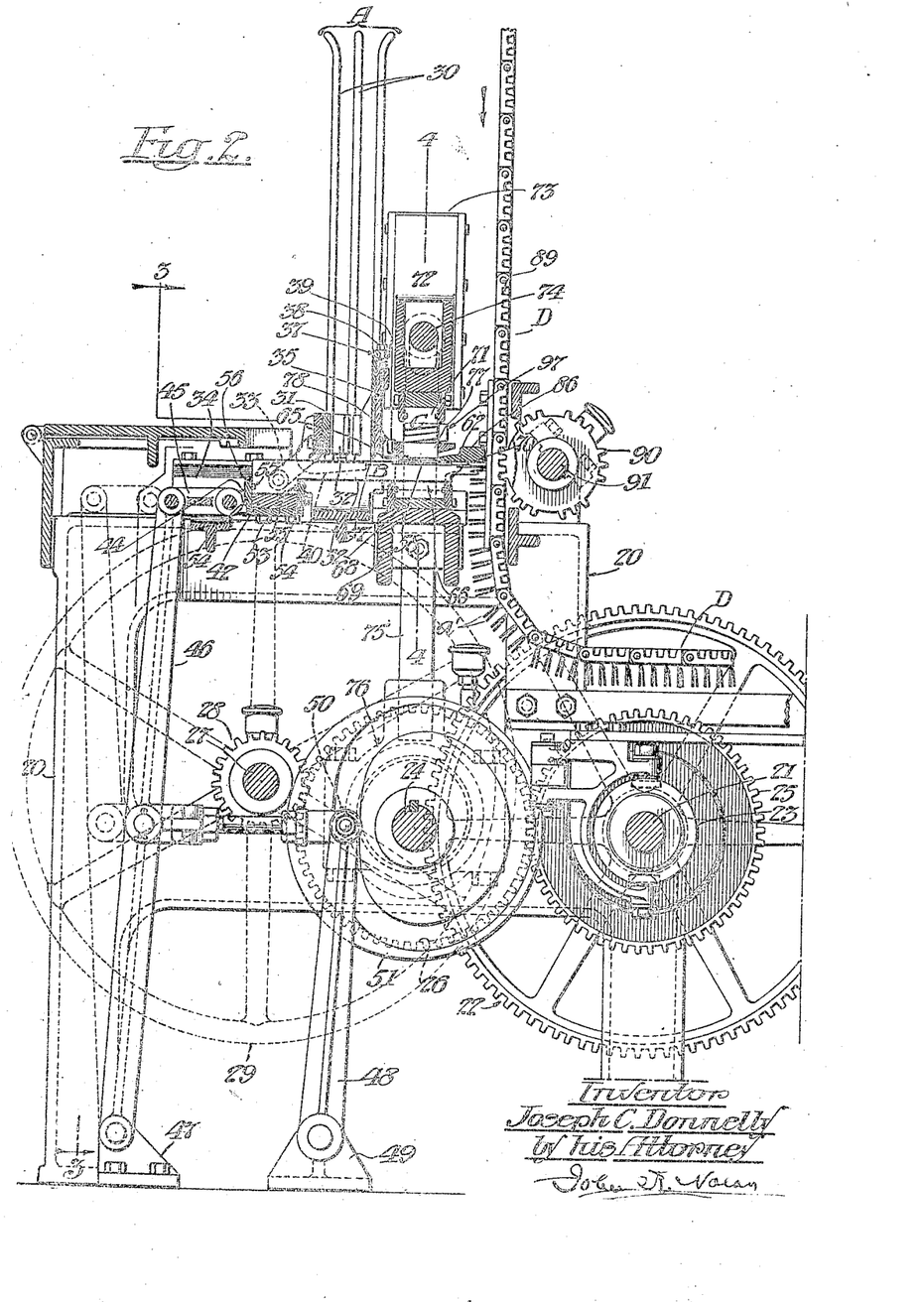
Fig. 2 is a longitudinal vertical section of the machine, as on the line 2—2 of Fig. 1.
Figure 3:
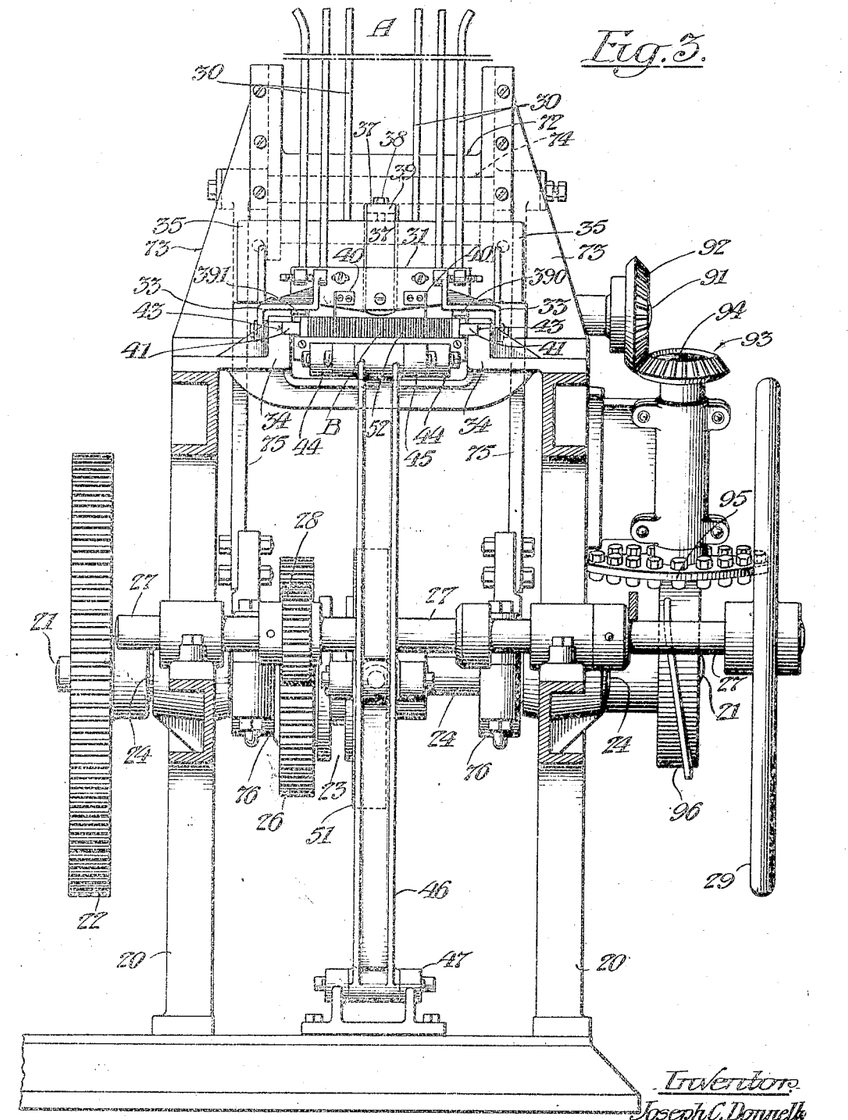
Fig. 3 is a transverse vertical section thereof, as on the line 3—3 of Fig. 2.
Figures 4, 5:
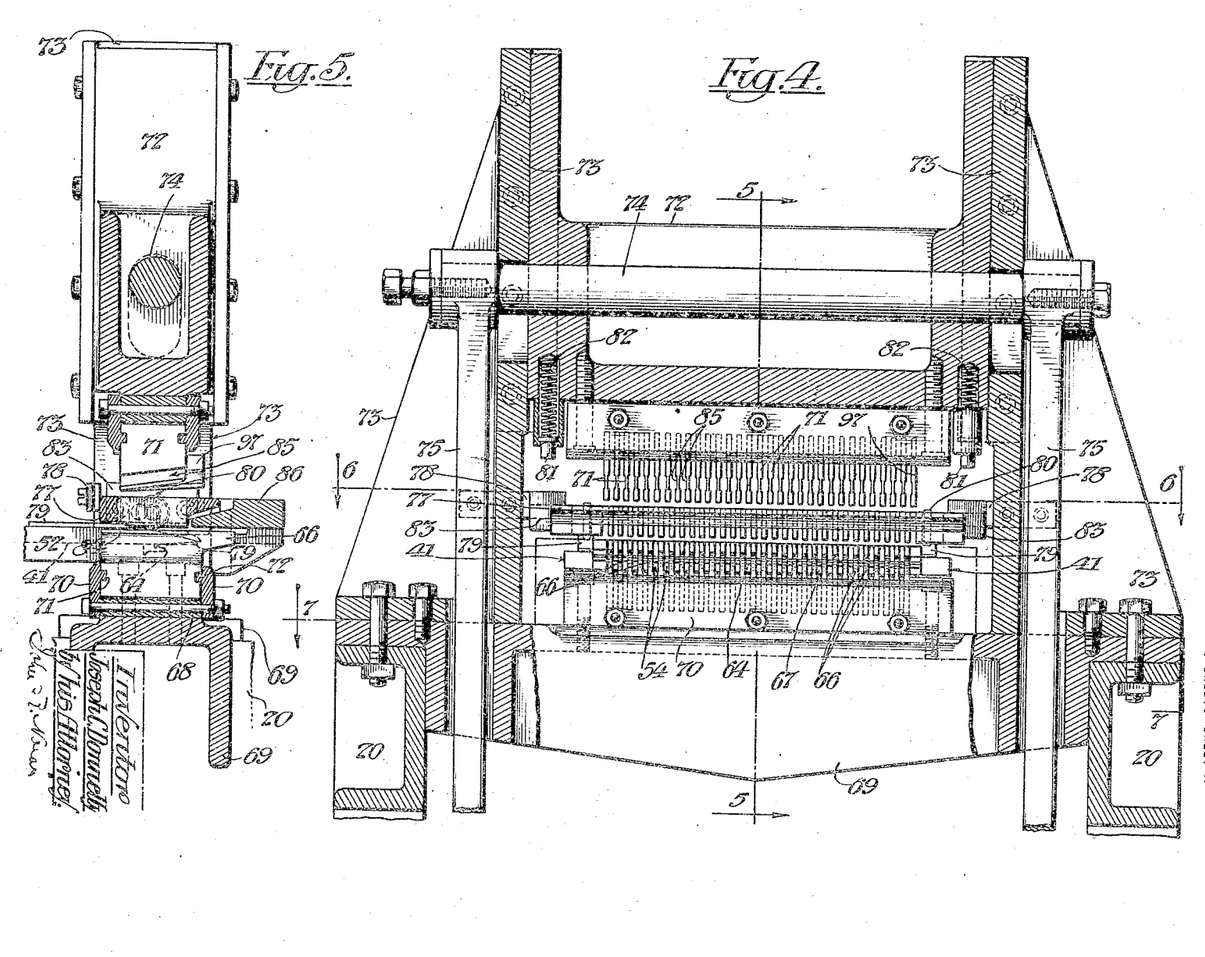
Fig. 4 is a similar section through the cutting mechanism and associated parts, as on the line 4—4 of Fig. 2.
Fig. 5 is a longitudinal vertical section, as on the line 5—5 of Fig. 4.
Figure 6:
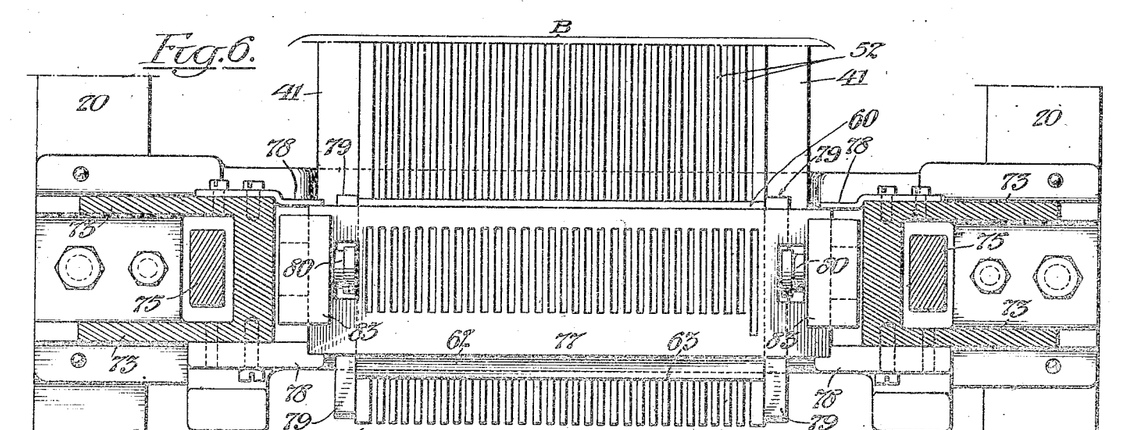
Fig. 6 is a partial horizontal section, as on the line 6—6 of Fig. 4, showing the grid-like stripper and adjuncts.

The hopper or magazine (A) herein illustrated comprises suitably-disposed upstanding rods 30 constituting supports for a stack of superposed blank cards. The rearward (left-hand of Fig. 2) and end rods rise from a hingedly-mounted basal structure, including a rear wall 31 having inwardly-extending end members 32, and also having depending bracket arms 33 which are pivoted to the spaced parallel portions 34 of a longitudinal guide structure supported on the main frame. (See Figs. 1, 2 and 3). The transfer head is mounted to reciprocate in guide ways in the parallel portions of the guide structure, so as to travel directly beneath the hopper and receive and withdraw the lowermost card, as will presently appear.

The rods 30 constituting the forward supports for the stack of cards rise from a stationary wall plate 35 adjacent the path of the transfer head. This plate is provided with end lugs 36 which are bolted to the body of the guide structure. On the inner side of the wall plate is a vertically adjustable plate 37 the lower edge of which may be nicely set in spaced relation to the adjacent upper surface of the transfer head so as to permit the egress of the lowermost cards individually from the hopper. In the present instance the adjustment of the plate 37 is effected by means of an adjusting screw 38 which operatively connects a lug 39 on the plate 37 with the upper part of the wall plate 35. (See Figs. 1, 2 and 3.) Preferably this wall plate is provided exteriorly thereof, adjacent the ends of its card outlet portion, with a fixed stop 390 and a spring pressure finger 391, respectively, which are so arranged in spaced relation to each other that as each lowermost card is being ejected from the hopper one end of the card is squarely pressed against the stop by the action of the spring against the opposite end thereof; thus insuring the accurate positioning of the respective cards regardless of slight variations in their lengths. In the present instance the stop and finger are formed on bracket members which are secured to the wall plate of the hopper.

Affixed to the pivoted basal wall of the hopper are two spaced hook-like arms 40 which extend horizontally beneath the hopper, and below the upper surface of the transfer head when the hopper is in upright position, thus permitting the delivery of the cards to the head. When, however, the pivoted hopper is swung rearward the arms 40 impinge against the bottom of the stack of cards and bodily raise the stack above the path of the transfer head, thus permitting the head to reciprocate idly. The arms are freely movable through longitudinal slots in the transfer head, as shown. By the construction described the feeding of the cards from the hopper to the transfer head can be discontinued by and at the will of the attendant without the otherwise necessity of stopping the operation of the entire machine.

The transfer head (B) in its preferred construction, includes two suitably-spaced side members 41 connected at their rearward end by a cross-member 42. The side members are slightly fitted to parallel guide ways 43 in the longitudinal guide structure on the supporting frame, and the cross-member 42 has affixed thereto a bracket 44 which supports a pivotal link frame 45 connecting the head with the upper end of an upstanding lever 46. The lever, which is pivoted to a suitably-disposed bracket 47 at the base of the main frame, is connected to an upstanding lever 48 also pivoted to a suitably-disposed base bracket 49. The inner end of the link bears a roller 50 which enters the race of a face cam 51 on the secondary shaft; the contour of the race being such that during a part of the rotation of the cam the levers are oscillated and the transfer head is thus reciprocated in its guide ways. In the remainder of the rotation of the cam the transfer head is at rest, the dwell occurring when the transfer head is at the limit of its rearward movement. (See Figs. 1, 2 and 3.)

Fixed upon the frame structure 41, 42, longitudinally thereof and in spaced parallel relation to each other, are a series of counterpart horizontal bars 52, the tops of which bars and the intervening spaces being each equal in width, or substantially so, to the width of a match splint. The rearward ends of the bars 52 are provided with depending lugs 53 which are seated in spaced parallel grooves in the top of the bar 42 of the frame structure and are rigidly held thereto by clamp-bars 54 which are bolted to the respective sides of the bar 42. To insure the positive locking of the series of bars 52 the lugs thereof are preferably provided in their vertical edges with grooves 55 which receive tongues 56 formed on the inner sides of the clamp bars 54. The upper edge of each bar 52 comprises three step-like surfaces 57, 58, 59 respectively, descending successively from the rearward to the forward end of the transfer head. The rearward and middle surfaces each exceed in length the width of a card, and the length of the forward or lowermost surface is less than that of a card. The drop of the middle surface below the rearward surface is slightly less than the thickness of a match card, and the drop of the forward surface below the middle surface is slightly greater than the thickness of a card.

A relatively-thin sectional cross-bar 60, flush with and adjacent the rearward surface of the assembled bars 52, extends across the intermediate surface 58 of the bars so as to present an abutment or shoulder 61 to the contiguous rearward edge of the lowermost card of the stack when such intermediate surface is brought beneath the hopper and in position to receive the card; which abutment or shoulder, in the succeeding forward movement of the transfer head, positively advances the card to and positions it in the active path of the splint forming mechanism. At the same time the forward end of the transfer head engages a previously cut card and pushes it toward and into engagement with the carrier D, as below described. A comparatively thin sectional cross-bar 62 flush with the intermediate surface of the head extends across the forward or lowermost surface of the assembled bars; the forward edge of the bar 62 being provided with a lip or ledge 63 which overhangs the adjacent surface of the bar 52. The forward ends of the assembled bars 52 are beveled or tapered as shown so as to insure their free entry between the staggered splints of a card during the stroke of the transfer head toward the carrier D. The under inclined surfaces of the forward nose portions of the bars 52 are provided with lips 64 in or about the same vertical plane as the upper lips 63, which upper and lower lips are designed snugly to engage the free ends of the adjacent splints respectively throughout the length of the card, during the forward stroke of the transfer head, and thus, in conjunction with the interposed forward portions of the bars 52, effect and maintain the firm and steady advancement of the card of splints toward the carrier in such a manner as to engage the leading or marginal portion of the card efficiently with the carrier. (See Figs. 12 and 13.)

In the succeeding back stroke of the transfer head it recedes from the card of splints thus positioned in the carrier and returns below the hopper in position to receive a succeeding blank therefrom. While the transfer head is in its thus retracted position the blank previously positioned at the splint forming mechanism is acted upon by the latter.

In order to prevent the retrograde movement of the thus positioned card with the receding transfer head, a suitable stop for the rearward edge of the card is provided. In the present instance this stop comprises a light spring plate 65 which overhangs the path of the transfer head, one edge of the plate being flanged and affixed to the forward wall of the hopper and the other or free edge of the plate inclining into yielding contact with the said head. Such free edge thus permits the advancement of a card in the forward movement of the head, and yet assumes a position in rear of the card deposited at the cutting mechanism so as to prevent rearward travel of the card with the head.

It is to be noted that each of the bars 60, 62 is made in sections, the adjacent ends whereof are slightly separated as shown in order to avoid obstruction of those slots of the transfer head into which the hopper arms 40 extend.

The splint-forming mechanism, in its preferred construction, includes complementary upper and lower cutting and die structures, respectively, between which the blanks are successively delivered from the hopper by the transfer head.

The lower or die structure comprises a row of spaced counterpart bars 66 arranged in parallelism with and in alternation with the bars 52 of the transfer head, whereby during the reciprocation of the said head the bars thereof pass freely through the spaces between the adjacent die bars and clear therefrom all deposits of dust and waste material. An undercut lip 67 formed at the forward inclined end of each bar 52 facilitates the clearing operation.

The upper edges of the bars and the intervening spaces of the stationary die member, similarly to the bars and spaces of the transfer head, are each equal in width, or substantially so, to the width of a match splint. These die bars, similarly to the lugs of the bars 52, are seated in parallel grooves formed in a bar 68 which is bolted to a suitably-disposed cross-bar 69 of the main frame, and are rigidly held in place by clamp plates 70 which are bolted to the respective sides of the grooved bar 68; the said die bars being provided in their vertical edges with grooves 66' which receive tongues 70' formed on the inner sides of the clamp plates 70.

The upper or cutting structure comprises a series of cutter bars 71 having inclined cutting edges. These cutter bars alternate with the die bars 66 and correspond substantially in width with the alternate spaces of the die structure so as to be reciprocable into cutting relation with the respective upper edges of the die bars. The cutter bars 71 are rigidly affixed to a vertically reciprocative cross-head 72, preferably in the same way that the die bars are secured to the frame bar 68. This head is mounted in and between a pair of guide standards 73 on the main frame. Through the body of the head extends a rod or shaft 74, the ends of the latter extending freely through vertical slots in the standards 73 and being connected by means of rods 75 with the straps of eccentrics 76 on the secondary shaft.

77 designates a horizontal grid-like structure the bars and spaces whereof overlie and correspond in number and position with the bars and spaces of the die member. This grid structure is supported between the standards 73 in any suitable manner so as to have capacity for limited vertical movement in relation to the underlying die member. In the present instance brackets 78, affixed to the standards, engage the corners of and afford vertical guides for the grid structure.

The grid structure is temporarily raised and permitted to drop at intervals during the reciprocation of the transfer head. In the present instance this operation is effected by means of forwardly-projecting cam bars 79 on the respective side members 41 of the transfer head coacting with anti-friction rollers 80 which are conveniently mounted to rotate in apertures in the end portions of the grid structure. The relation of the cam bars to the rollers is such that as the transfer head approaches the limit of its forward stroke the said bars pass beneath and impinge against the rollers, thereby bodily lifting the grid structure and maintaining it in spaced parallel relation to the die member until the card of splints has been introduced to the carrier. In the rearward stroke of the transfer head, preparatory to its interval of rest, the cam bars recede from the rollers and thus permit the grid structure to drop and so rest upon the blank previously moved upon the die member. It is to be here noted that in the forward stroke of the transfer head the blank taken thereby from the hopper is advanced slightly beyond the vertical path of the cutter bars, but that in the rearward movement of the head this blank is slightly retracted against the opposing edge of the stop plate 62 and thereby accurately positioned with relation to the path of the cutter bars. While the blank is thus positioned and when the transfer head is at rest the cutter head is vertically reciprocated.

Figures 10, 11, 12, 13:
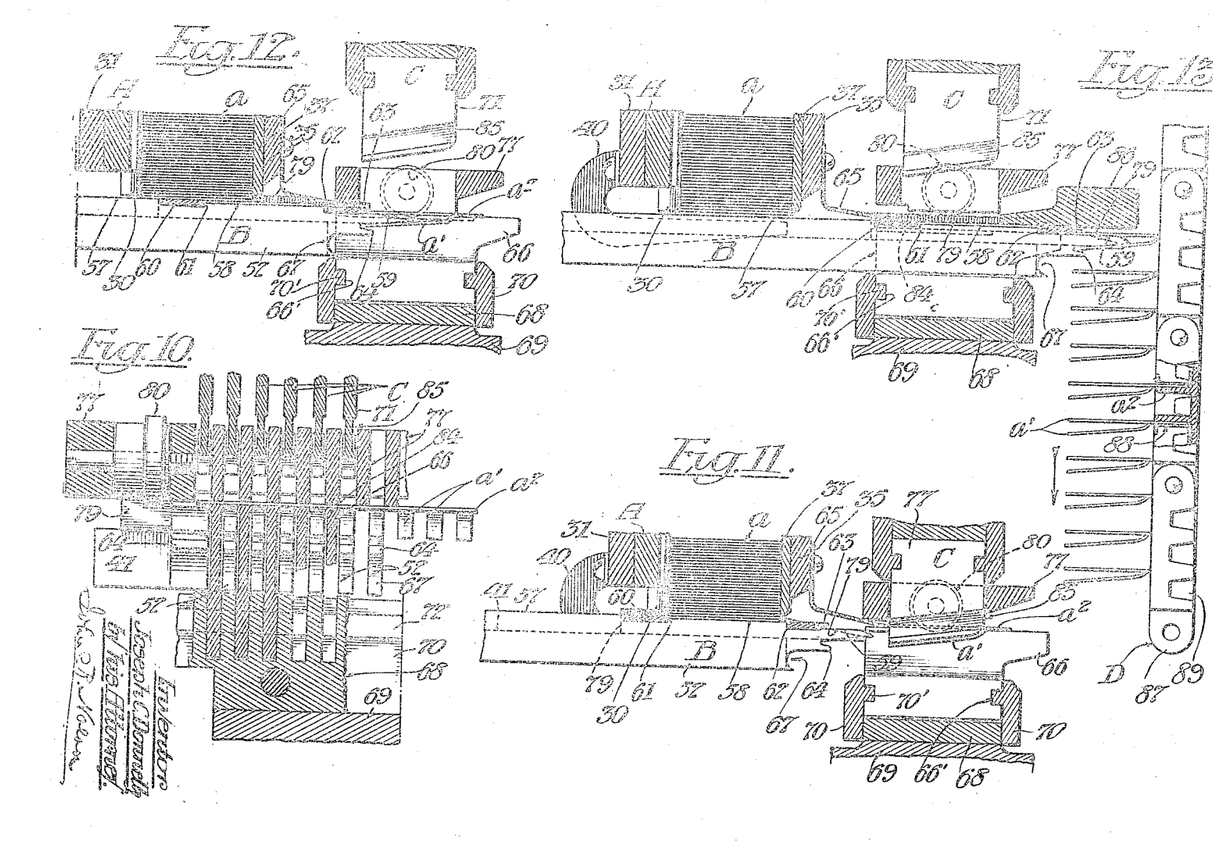
Fig. 10 is a sectional detail of one end of the stripper, and the adjacent portions of the cutter and die members, showing the cutter members in their up-stroke immediately after their splint-forming action upon the card. In this view the relation of one of the cams on the transfer head to the adjacent roller on the stripper is indicated.
Fig. 11 is a sectional detail of the lower portion of the card supply hopper, a portion of the transfer head, the splint-forming mechanism and the stripper, said head being shown in its rearward or blank receiving position and the said mechanism being at the completion of its splint-forming action.
Fig. 12 is a similar view, showing the transfer head partially advanced to raise the stripper and immediately engage the card of splints preparatory to the transference of said card to the carrier.
Fig. 13 is a similar view, including a portion of the carrier chain, showing the transfer head in its extreme forward position with the card of splints inserted thereby into a card-holder of the carrier chain; and showing also the stripper in raised position.

In their downward stroke the cutter bars pass into the spaces of the grid structure and sever the opposing portions of the card, the inclined acting edges of the cutter bars gradually depressing the unsupported splints, as they are being formed, below the splint material which rests on the bars of the die structure. Two rows of splints are thus formed in the card in staggered relation to each other, that is, the lower row inclines below the upper row, as seen in Fig. 10.

The cutter head is provided adjacent its ends with plungers 81 which are normally projected below the head by the action of compression springs 82 confined within suitably-disposed sockets in the cutter head. These plungers impinge against blocks 83 at the respective ends of the grid structure as the cutter head descends in its cutting stroke; the springs, by their compression, permitting the active travel of the cutters and yet insuring ample pressure upon the end blocks of the grid structure.

The grid structure performs the function of a stripper to prevent the lifting of the card of splints by and with the cutter bars during the upward movement of the latter; the bars of the stripper being in contact with the upper row of splints and the action of the spring-pressed plungers on the end blocks 83 continuing until the cutter bars have been entirely withdrawn from the underlying card.

The sides of the parallel die bars 66 are preferably shaped to present longitudinal ledges 84 adjacent their upper edges. These ledges constitute cutting edges and the recessed portions below the same afford clearance spaces to reduce the frictional resistance between the lower or inclined row of splints and the die bars and thus facilitate the advancement of the match card to the carrier.

Longitudinal channels 85 are preferably formed in the respective sides of the cutter bars so as to reduce the friction between the contacting surfaces of the cutter and die bars.

A transverse bar 86 is supported at the respective sides of the main frame so as to overhang the path of the transfer head in the space between the grid structure and the carrier, and thus present an overlying guide surface to the card of splints as it is being advanced to and engaged with the carrier by the transfer head.

Any usual or approved form of carrier for receiving the match cards and transferring them through the various stations for impregnation, heading, &c., may be employed. The carrier herein illustrated comprises a chain of recessed links 87 provided at regular intervals with spring clips 88 which co-act with the adjacent walls of the recesses to afford regularly spaced card holders which, by the intermittent movement of the chain, are brought successively to the horizontal path of the margins of the cards of splints as such cards are advanced by the transfer head. The margins of the successive cards are thus moved into the grasp of the holders, and when the transfer head is retracted, such cards, with their staggered splints projecting outwardly, remain in the carrier and are thereby transported through the machine for treatment in the usual manner.

In the form of carrier represented the links are provided with gear teeth 89 with which mesh pinions 90 on a transverse shaft 91 having its bearings in boxes in the main frame. On this shaft 91 is a bevel gear wheel 92 which meshes with a similar wheel 93 on the upper end of an inclined shaft 94 which carries at its lower end a pin wheel 95 in gear with an appropriate cam wheel 96 on the secondary shaft 24, whereby during the operation of the latter the requisite step-by-step movement is imparted to the carrier.

Card matches produced as above described may be divided into a series of uniform sections for association with suitable covers, as described, for example, in Patent No. 1,042,472, dated October 29th, 1912.

In the well-known match books of commerce each book contains two superposed card sections having ten matches each, the corresponding matches of each section being placed flatwise in close relation to each other, so as to provide a compact and shapely package. This necessitates such a division of the card that the outermost end matches of each section are in different planes, or "staggered". To produce match cards which may be properly divided as and for the purpose mentioned, I provide blanks each of which is of slightly greater length than is required for the division of the same into six sections containing ten matches each. During the slitting operation the excess material at one end of the blank (i. e. the end acted upon by the pressure member at the hopper) is removed by an auxiliary end cutter bar 97 on the head 72, which cutter bar is similar in construction to the other cutter bars, but is of greater length so as to trim the end of the card throughout its width. Thus the end splint, adjacent the cutter 97, is supported upon the proximate bar of the die member, while the opposite end splint of the card is cut and depressed by the overlying end cutter bar of the series; or, in other words, each of the cards is the same length and the outermost end splints of the card are in different horizontal planes.

While I have herein illustrated and described the source of card supply as a hopper or magazine for a stack of prepared blanks, it is obvious that with certain stock the cards may be successively cut from a continuous roll and intermittently presented to the transfer head when the latter is at the limit of its rearward stroke.

I claim—

1. In a match machine, the combination with a source of card supply, and splint-forming mechanism spaced therefrom comprising complementary cutter and die elements each including a series of bar members in spaced parallel relation to each other, of a transfer head having a longitudinally slotted card-supporting surface, means for reciprocating said head in a path between the source of card supply and the splint-forming mechanism, whereby in each forward stroke of the head the said surface thereof receives a card and transfers it to and between the said cutter and die elements of the splint-forming mechanism, means for preventing displacement of the card during the rearward stroke of the transfer head, and means for actuating said splint-forming mechanism when the transfer head is retracted therefrom.

2. In a match machine, the combination with a source of card supply, a traveling carrier spaced therefrom, and splint-forming mechanism between said source of supply and carrier, said mechanism comprising complementary cutter and die elements each including a series of bar members in spaced parallel relation to each other, of a transfer head having a forward portion adapted to engage a slitted match card and introduce it to the carrier, and having in rear of said portion a longitudinally-slotted card-supporting surface, means for reciprocating said head in a path between the source of card supply and the splint-forming mechanism, whereby in each forward stroke of the head the said surface thereof receives a card and transfers it to and between the cutter and die elements of the splint-forming mechanism, and at the same time a previously-positioned card at said mechanism is introduced to the carrier by the forward or leading portion of the transfer head, means for preventing displacement of the card at the splint-forming mechanism during the rearward stroke of the transfer head, and means for actuating said mechanism when the transfer head is retracted therefrom.

3. In a match machine, the combination with a traveling carrier having card-holding means, and means for partially slitting a card and producing therein staggered splints having a common connecting portion at one end, of a reciprocative element having a portion adapted to extend between and engage the separated free ends of the splints, and means for reciprocating said element whereby the card of splints is advanced to, and its splint-connecting portion is engaged with, the card-holding means of the carrier.

4. In a match machine, the combination with a traveling carrier having card holders, means for partially slitting a card and producing therein staggered splints having a common connecting portion at one end, of a reciprocative element having a tapering portion adapted to extend between the separated free ends of the splints and having also upper and lower lips adapted to engage the ends of the adjacent splints, and means for reciprocating said element whereby the card of splints is advanced to, and its splint-connecting portion is engaged with, the card-holding means of the carrier.

5. In a match machine, the combination with splint-forming mechanism, and a reciprocative head for feeding cards successively thereto, of a clamp element movable upon and from the card at said mechanism, and means operable by the movement of said head for actuating said clamp element.

6. In a match machine, the combination with splint-forming mechanism, and a reciprocative head for feeding cards successively thereto, of a clamp element movable upon and from the card at said mechanism, said element having cam-engaging portions, and cam bars on the said head arranged to impinge against and recede from said portions during the reciprocation of the head and thus control the position of the clamp element in relation to the card.

7. In a match machine, the combination of splint forming mechanism comprising relatively movable cutter and die elements, each including a series of bar members in spaced relation to each other, a card clamping element arranged between the cutter and die elements, a reciprocative head including a longitudinally slotted card-supporting and feeding portion the spaced members of which are movable between the bars of the die element and beneath the clamping element, and means whereby said clamping element is moved toward and from the die element at predetermined intervals during the travel of said head.

8. In a match machine, the combination of splint-forming mechanism comprising relatively movable cutter and die elements, each including a series of bar members in spaced relation to each other, a vertically movable grid structure superposed on the die element and having bars and spaces corresponding with those of said die element, a reciprocative head including a longitudinally slotted card supporting and feeding portion the spaced members of which are movable between the bars of the die element and beneath the grid structure, and means whereby said grid structure is raised and permitted to descend at predetermined intervals during the travel of said head.

9. In a match machine, the combination of splint-forming mechanism comprising a vertically reciprocative head carrying a series of spaced cutter bars, and a stationary die element having a corresponding series of spaced bars with which the cutter bars co-act, a vertically-movable grid structure supported on the die element and having bars and spaces corresponding with those of the die element, a reciprocative head including a longitudinally slotted card supporting and feeding portion the spaced members of which are movable between the bars of the die element and beneath the grid structure, and means whereby said grid structure is raised and permitted to fall at predetermined intervals during the travel of the card-feeding head, together with yielding pressure means between the first-named head and the grid structure.

10. The combination with a source of card supply, splint-forming mechanism, and a carrier, all arranged in the order named in spaced relation to each other, of a horizontal transfer head having thereon three step-like card-supporting surfaces arranged in descending order from the source of supply, means for reciprocating said head between the source of supply and the carrier, and means for actuating said splint-forming mechanism at predetermined intervals with respect to the travel of the head.

11. The combination with a source of card-supply, splint-forming mechanism for slitting a card and producing therein staggered splints having a common connecting portion at one end, and a carrier, all arranged in the order named, of a horizontal transfer head having thereon three step-like card-supporting surfaces arranged in descending order from the source of supply, the lowermost surface extending to the forward end of the head and said end being shaped to provide a tapering nose portion, means for reciprocating said head between the source of supply and the carrier, and means for actuating said splint-forming mechanism at predetermined intervals with respect to the travel of the head.

12. The combination with a source of card-supply, splint-forming mechanism, and a carrier, all arranged in the order named in spaced relation to each other, of a horizontal transfer head having thereon three step-like card-supporting surfaces arranged in descending order from the source of supply, means for reciprocating said head between the source of supply and the carrier, means for actuating said splint forming mechanism at predetermined intervals with respect to the travel of the head, a clamp member movable upon and from a card positioned by the head at the splint-forming mechanism, and means for raising the said member during the forward stroke of the head and permitting its descent during the rearward stroke of the head.

13. In a match machine, the combination with a traveling carrier having card-holding means, of splint-forming mechanism comprising relatively movable cutter and die members, each including a series of bars in spaced relation to each other, the bars of the movable member having inclined acting edges, a reciprocative head for feeding cards between the cutter and die members and for delivering the cards when cut to the card-holding means of the carrier, a clamp member movable upon and from the card at the splint-forming mechanism, and means for periodically actuating said clamp member.

14. In a match machine, the combination with a source of card supply, and splint-forming mechanism spaced therefrom comprising complementary cutter and die elements, each including a series of bars in spaced parallel relation to each other, of a transfer head having a card-supporting surface comprising a series of spaced bars arranged to slide in and longitudinally of the spaces between the die bars, whereby the bars of the transfer head act as clearers for the spaces of the die member, means for reciprocating said head in a path between the source of card supply and the splint-forming mechanism, whereby in each forward stroke of the head the upper surface thereof receives a card and transfers it to and between the said cutter and die elements of the splint-forming mechanism, means for preventing displacement of the card during the rearward stroke of the transfer head, and means for actuating said splint-forming mechanism when the head is retracted therefrom.

15. In a match machine, splint forming mechanism for slitting a card and producing therein staggered splints having a common marginal connecting portion, said mechanism comprising a reciprocative head carrying a series of spaced cutter bars having inclined cutting edges, said bars excepting one of the end bars of the series being of less length than the width of the card, and said end bar being of a length at least equal to the width of the card, and a stationary die element having a series of spaced bars with which the cutter bars co-act.

16. In a match machine, the combination with a support, and a card-supply hopper hinged at its lower portion to said support having arms which underlie the hopper, of splint-forming mechanism spaced horizontally from the hopper, and a reciprocative head for transferring the successive cards from the hopper to said mechanism, said head having therein longitudinal ways for the hopper arms.

17. In a match machine, the combination with a card supply hopper having an outlet portion for single cards, and a fixed stop and a pressure member adjacent the respective edges of the outlet, of splint forming mechanism spaced horizontally from the hopper and having a supplemental trimming portion for that end of the card acted upon by the pressure member, and a reciprocative head for transferring the successive cards from the hopper to said mechanism.

JOSEPH C. DONNELLY.